Sept. 12, 1961 F. L. SMITH 2,999,700
COUPLING FOR FLARED END TUBES INCLUDING
INNER AND OUTER SLEEVE ELEMENTS
Filed Feb. 13, 1956 3 Sheets-Sheet 1

INVENTOR.
Francis L. Smith
BY
ATTORNEY.

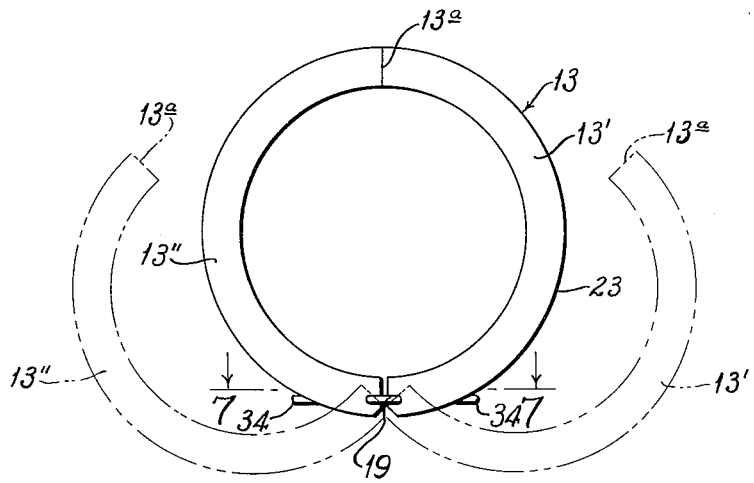
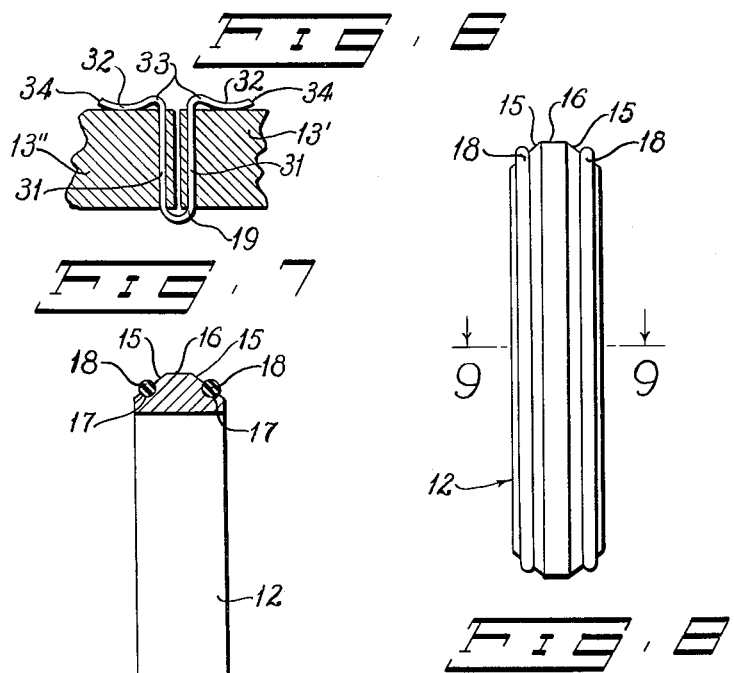
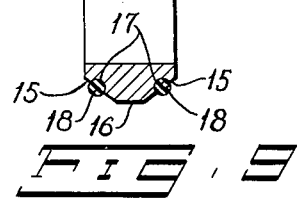

Sept. 12, 1961     F. L. SMITH     2,999,700
COUPLING FOR FLARED END TUBES INCLUDING
INNER AND OUTER SLEEVE ELEMENTS Filed Feb. 13, 1956     3 Sheets-Sheet 3

INVENTOR.
Francis L. Smith
BY
Charles S. Wilson
ATTORNEY.

United States Patent Office 2,999,700
Patented Sept. 12, 1961

2,999,700
COUPLING FOR FLARED END TUBES INCLUDING INNER AND OUTER SLEEVE ELEMENTS
Francis L. Smith, West Islip, N.Y., assignor to Republic Aviation Corporation, near Farmingdale, Suffolk County, N.Y., a corporation of Delaware
Filed Feb. 13, 1956, Ser. No. 564,849
2 Claims. (Cl. 285—332.3)

This invention relates to tube or pipe couplings and contemplates a device that will clampingly and sealingly engage the flared ends of tubes or pipes. While being of general application and use, the present coupling finds particular utility in aircraft where it, in one form, can be employed to sealingly secure the flared end of a pipe or tube to an accessory or fitting, and in another form it can be used to sealingly attach the adjoining flared ends of a pair of pipes or tubes one to the other whereby one pipe or tube constitutes a substantially unobstructed continuation of the other.

Among its other objects, the instant invention proposes a relatively small light-weight coupling that is easily applied or removed, usually includes no threaded parts, and generally requires no tools for its application or removal.

Moreover, this coupling in its preferred form embodies and requires no rotary or tortional parts or components so that its application and removal is simplified and less space is needed for such application and removal than is necessary with couplings having rotary parts.

Seals are provided in the instant coupling for cooperation with the flare or flares of the connected tubes or pipes and in application, the coupling in being locked in place progressively increases the pressure on such seals to insure complete sealing contact between the flare or flares of the tubes or pipes and the seals and to likewise increase the clamping or securing action between the coupling and the ends of the engaged tubes or pipes.

With the above and other objects in view, as will be apparent, this invention consists in the construction, combination and arrangement of parts all as hereinafter more fully described, claimed and illustrated in the accompanying drawings wherein:

FIG. 6 is an edge or end elevation of the sectional clamp embodied in the instant coupling, illustrating its opened sections in phantom lines;

FIG. 7 is a section through the clamp along line 7—7 of FIG. 6 to illustrate the means by which the sections thereof are hinged together and the lock by which the components of the coupling are secured after assembly;

FIG. 8 is a side elevation of the back-up and sealing ring that coacts with the sectional clamp to grip the adjoining flared ends of a pair of tubes or pipes;

FIG. 9 is a vertical section taken along line 9—9 of FIG. 8 through the back-up and sealing ring;

The coupling of the present invention is primarily intended to releasably and sealingly secure the adjacent ends of a pair of tubes or pipes 10 and 11 one to the other. These ends of the pipes 10 and 11 are respectively flared outwardly, as at 10' and 11', and when positioned adjacent to each other, the flares 10' and 11' diverge from their respective tubes but converge toward each other.

Basically, the present coupling consists of a back-up, force-distributing and sealing ring 12, a sectional clamp 13 adapted to overlie and coact with the back-up or sealing ring 12 in engaging both of the flares 10' and 11', and a locking and pressure sleeve 14 adapted to encircle the clamp 13 and secure it in its operative position. When assembled, these enumerated elements are concentric and the ends or edges of the sleeve 14 and clamp 13 rest in substantially the same plane as they are approximately coextensive.

Figure 3:
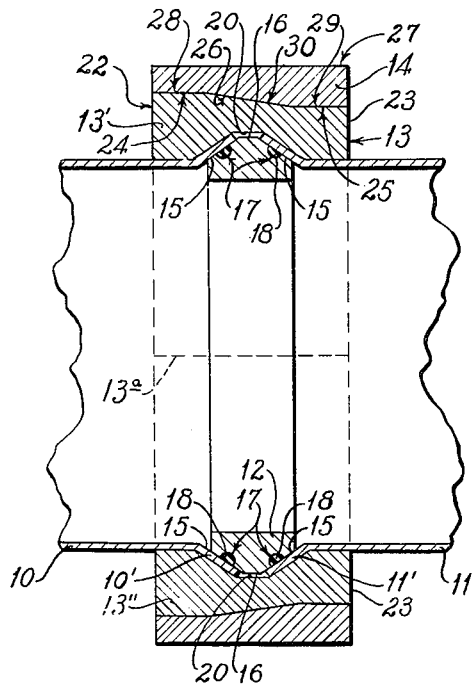
FIG. 3 is a section taken along line 3—3 of FIG. 1 through the coupling and a pair of tubes or pipes engaged or secured thereby.

The back-up or sealing ring 12 (FIGS. 3, 8 and 9) is circular and in section is generally wedge-shaped or truncated, triangular or rhomboidal. Thus, the ring 12 has two side surfaces 15 flanking and converging toward a relatively flat, centrally disposed periphery or edge 16 which is substantially parallel to the axis of the coupling after assembly. As the side surfaces 15 of the ring 12 are adapted to underlie and coact with the flared ends 10' and 11' of the connected tubes or pipes 10 and 11, the angular disposition of these side surfaces corresponds to the angles of the flares 10' and 11'. Hence, when the coupling is assembled, the side surfaces 15 of the ring 12 are disposed parallel to the flares 10' and 11' of the tubes 10 and 11. Each side surface 15 of the ring 12 is provided with an annular open pocket 17 medially of its width in which is seated an elastic seal 18 that is circular in form, but may be of any suitable section shown here as an O-ring. The depth of each pocket 17 is such that a substantial part of the seal 18 seated therein projects beyond the surrounding side surface 15 of the ring 12.

Positioned over the back-up or sealing ring 12 is the sectional clamp 13. This clamp 13 consists of two semi-circular sections 13' and 13" hinged together by a U-shaped hinge 19 at one pair of adjacent ends of the sections 13' and 13" about which these sections swing to and from the positions where the free ends 13a thereof adjoin. After the clamp 13 is closed, i.e. when the ends 13a of its sections 13' and 13" adjoin, it is a complete circle having an internal diameter somewhat smaller than the external diameter of the ring 12.

The interior faces of the sections 13' and 13" of the clamp 13 are each provided with a groove 20, the groove of one section forming a continuation of the groove in the other section. The side walls 21 of the grooves 20 in the inner face of the sections 13' and 13" of the clamp 13 are angularly disposed to converge one towards the other centrally of the clamp 13. The angles at which these side walls 21 of the groove 20 are disposed respectively correspond to the angles of the side surfaces 15 of the ring 12 and to the angles of the flares 10' and 11' at the ends of the pipes or tubes 10 and 11. Thus, when the back-up or sealing ring 12 is disposed within the flares 10' and 11', with the seals 18 in contact with the surfaces of these flares, the semi-circular sections 13' and 13" of the clamp 13 may be closed about the outer surfaces of the flares to hold them parallel to and in engagement with the side surfaces 15 and seals 18 of the ring 12.

Figure 5:
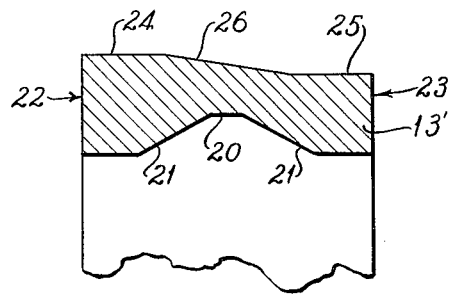
FIG. 5 is a similar section taken through the clamp which is ultimately surrounded by the locking pressure sleeve.

With the clamp 13 closed, its outer diameter at one end or edge 22 is greater than the outer diameter at its opposite end 23. This variation between the outside diameters at the opposite ends or edges 22 and 23 of the clamp 13 results in a greater thickness of the wall of the clamp at the end portion 22 than at the opposite end or edge portion 23. The thicker end 22 of the clamp 13 is defined by a cylindrical surface 24 extending inwardly from the edge 22 while the thinner end 23 is defined by a similar cylindrical surface 25 extending inwardly from the end 23, the surface 24 being substantially parallel to and situated outwardly of the surface 25. Between their inner edges, the surfaces 24 and 25 are connected by a cam surface 26 which is disposed centrally of the width of the clamp 13 and slopes outwardly from the surface 25 to the surface 24 (see FIG. 5).

Figure 4:
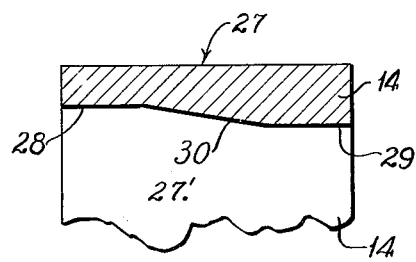
FIG. 4 is a transverse section through the locking pressure sleeve.

For the purpose of forcing the free ends 13a of the sections 13' and 13" of the clamp 13 toward each other and into approximate abutment and holding them in this position, a locking or pressure sleeve 14 encircles the clamp 13. This sleeve 14 has a width substantially equal to the width of the clamp 13 and its exterior surface 27 is cylindrical while its interior surface 27' is formed to correspond to the exterior surface of the clamp 13. Thus, the interior diameter of the sleeve 14 at one end is greater than its interior diameter at the opposite end, thereby creating a cylindrical inner surface 28 at that end of the sleeve having the greater inner diameter to correspond to and overlie the cylindrical outer surface 24 of the clamp 13 and a cylindrical surface 29 at the end of the sleeve 14 having the smaller inner diameter to overlie and correspond to the cylindrical outer surface 25 of the clamp 13. The inner edges of these cylindrical surfaces 28 and 29 are connected by an outwardly sloping cam surface 30 which generally corresponds to the cam surface 26 of the clamp 13 (see FIGS. 4 and 5).

In assembling the clamp 13 to connect and seal the adjoining ends of the pipes or tubes 10 and 11, the sleeve 14 is placed upon one of the tubes with its end having the larger diameter and cylindrical surface 28 facing toward the flare of that tube and the back-up or sealing ring 12 is positioned within the flares 10' and 11' of the tubes with the seals 18 in the pockets 17 thereof in contact with the inner surfaces of said flares. The open clamp 13 is then placed over the exterior surfaces of the flares 10' and 11' so that when closed the side walls 21 of the groove 20 thereof will bear on the exterior surfaces of such flares. The free ends 13a of the sections 13' and 13" of clamp 13 are then manually brought together as closely as possible. The sleeve 14 is then moved or slid over the clamp 13, the cylindrical inner surface 28 of the sleeve passing over the cylindrical outer surface 25 of the clamp 13. At this point in the assembly of the coupling, the outer edge of the cylindrical surface 28 of the sleeve contacts the cam or sloping surface 26 of the clamp. As the sleeve 14 progressively encompasses the clamp 13, the cylindrical surface 28 of the sleeve 14 defined by the larger internal diameter of the sleeve will remain in contact with and ride up the cam surface 26 of the clamp 13, exerting progressively increasing pressure on the seals 18 until the cylindrical surface 28 of the sleeve overlies and is in engagement with the cylindrical surface 24 of the clamp 13. When so positioned, the coaction between surfaces 28, 29 and 30 of the sleeve 14 and the corresponding surfaces 24, 25 and 26 of the clamp 13 prevents further movement in that direction.

This cooperation between the sleeve 14 and clamp 13 compresses and distorts the seals 18 and insures complete sealing engagement between them and the flares 10' and 11' throughout. When this ocurs, the free ends 13a of the sections 13' and 13" of the clamp 13 are in substantial abutment, the seals 18 are compressed into sealing engagement with the flares 10' and 11', and the sleeve 27 completely encircles and encloses the clamp 13 thereby locking it in its operative position.

The hinge 19 connecting the sections 13' and 13" of the clamp 13 may be constructed of spring or resilient wire bent upon itself in the form of a U to create the arms 31. Each of these arms 31 is received in a transverse aperture in one end of the sections 13' and 13" of the clamp 13. The engagement of the arms 31 of the hinge 19 in the apertures at the adjacent ends of the sections 13' and 13" hinges these ends of the sections together. The ends of the arms 31 opposite to the base of the U project beyond the edges of the sections 13' and 13" opposed to the base of the U-shaped hinge 19 where they are bent transversely in opposite directions to form the locks 32. These locks 32 are also bent toward the adjacent edges of the sections 13' and 13", as at 33, so that the terminal portions 34 thereof project beyond the outer surface of the clamp 13 and have an inherent resiliency operating in the direction of the edges of the sections 13' and 13".

Figure 1:
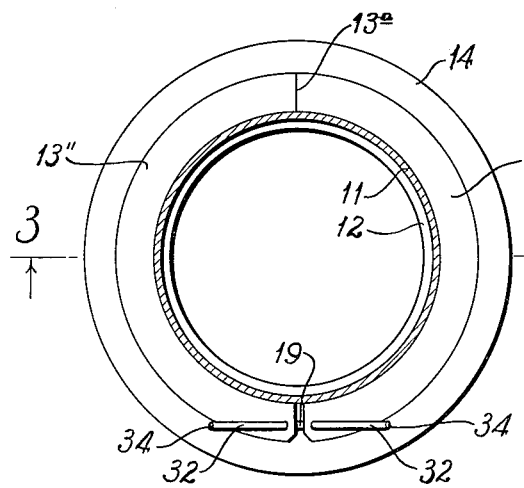
FIG. 1 is an edge or end elevation of a coupling constructed in accordance with the present invention.
Figure 2:
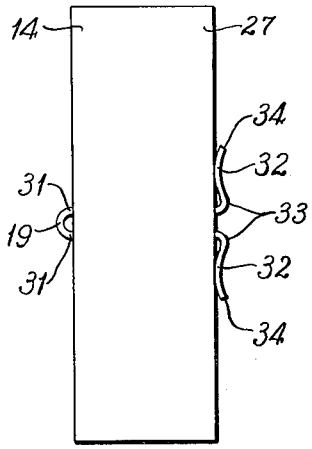
FIG. 2 is a side elevation thereof.

When the large diameter of the sleeve 14 is inserted over the clamp 13 as aforesaid, the sleeve freely passes over the locks 32 formed at the ends of the arms 31 of the U hinge 19 and when the cam surface 30 of the sleeve 14 contacts the end portions 34 of the locks 32, it swings the locks 32 in unison toward the axis of the coupling and maintains them in this position until the sleeve 14 is fully seated on and encloses the clamp 13. When the sleeve 14 is fully seated on and encloses the clamp 13, i.e. when the end edges of the sleeve 14 and the edges 22 and 23 of the clamp 13 rest in the same plane, the locks 32 are returned to their original positions by their inherent resilience where they project over the adjacent edge or end of the sleeve 14 (see FIG. 1). In this position, the locks 32 secure the sleeve 14 in its operative position on the clamp 13 where it maintains the clamp 13 closed and the seals 18 fully compressed between the flares 10' and 11' and the ring 12. Any retrograde movement of the sleeve 14 with respect to the clamp 13 is prevented by the locks 32 while continued movement of the sleeve 14 relative to the clamp 13 is counteracted by the cooperation of the external surfaces 24, 25 and 26 of the clamp 13 with internal surfaces 28, 29 and 30 of the sleeve. When the coupling is fully assembled, the surfaces 28 and 29 of the sleeve 14 overlie and are in contact respectively with the surfaces 24 and 25 of the clamp 13 while the cam surface 30 of the sleeve is disposed directly over, but not necessarily in contact with, the cam surface 26 of the clamp.

To remove the coupling from its operative position on the tubes or pipes 10 and 11, the locks 32 are manually or otherwise moved toward the axis of the coupling until they are out of engagement with the edge or end of the sleeve 14 whereupon the sleeve may be moved or slid in the reverse direction to ultimately release the clamp 13. When the sleeve 14 is thus removed from the clamp 13, the sections or jaws 13' and 13" of the clamp 13 may be swung outwardly to the position shown in phantom lines in FIG. 6 after which the clamp 13 and the back-up or sealing ring 12 may be removed.

Figure 10:
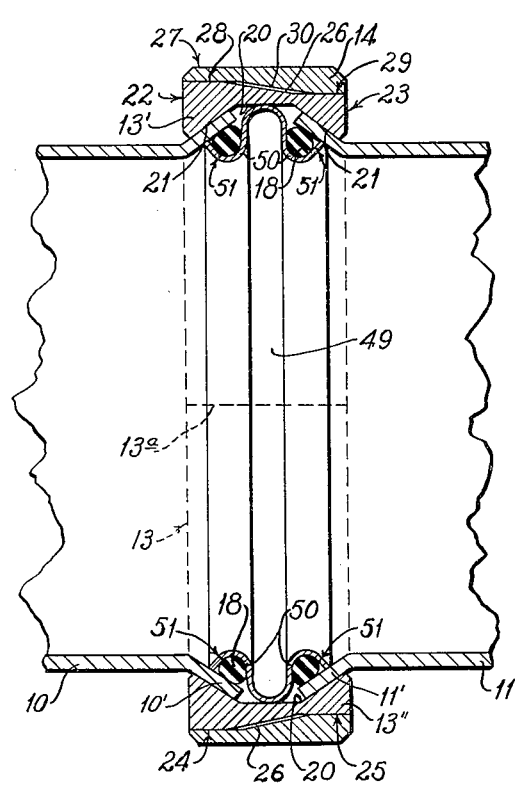
FIG. 10 is a section, similar to FIG. 3, illustrating a modification of the coupling applied to the flared ends of a pair of tubes or pipes.
Figure 11:
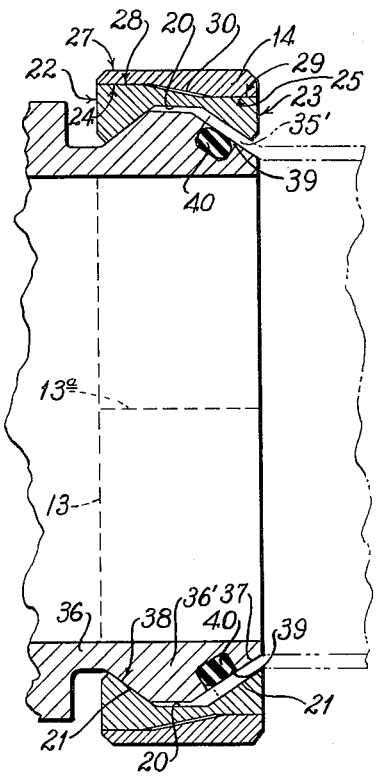
FIG. 11 is a similar sectional view of another modification of the present coupling adapted to secure or attach the flared end of a tube or pipe to a fitting or accessory.

In FIG. 11 is illustrated a modification of the present invention showing its utility in connecting the pipe 35 to the fitting 36 of an accessory such as a pump or hydraulic unit. In this form of the invention, the fitting 36 is provided with a rib 36', the outer surface 37 of which is disposed angularly to agree with the angle of the flare 35' at the end of the tube or pipe 35 and the outer side wall 21 of the groove 20 of the clamp 13. The opposed surface 38 of the rib 36' is angularly disposed to agree with the angle of the inner side wall 21 of the groove 20 in the clamp 13. In this manner, the surfaces 37 and 38 of the rib 36' of the fitting 36 correspond to and agree with the angles of the flare 35' of the pipe 35, which flare overlies and rests flush against the surface 37 and with the angles of walls 21 of the groove 20 of the clamp 13. An annular cavity 39 is provided in the surface 37 of the fitting 36 and a seal 40 is mounted in this cavity to project beyond the surrounding surface 37 in the same manner and for the same purpose as the elastic seals 18 in the pockets 17 of the back-up and sealing ring 12. In this form of the invention, the fitting 36 takes the place of the back-up and sealing ring 12 in the form of the invention shown in FIGS. 1 to 10, incl. and performs all of its functions. When the clamp 13 is placed over the fitting 36, one of the side walls 21 of the groove 20 therein bears against the surface 38 of the rib 36' of the fitting, while the other wall 21 is disposed over the surface 37 of such rib with the flare 35' of the tube 35 engaged between it and the surface 37. The cooperation between the locking and pressure sleeve 14 and the clamp 13 is identical in this form of the invention as in the forms shown in FIGS. 1 to 10 incl.

The form of invention shown in FIG. 10 substitutes a back-up and sealing ring 49 for that shown in FIGS. 1 to 9 incl. This ring 49 is generally U-shaped in section with its arms 50 rebent to create pockets 51 in which the seals 18 are mounted. Since the ring 49 is relatively resilient, being made of spring metal, it will force the seals 18 into engagement with the flares 10' and 11' of the tubes 10 and 11.

Figure 12:
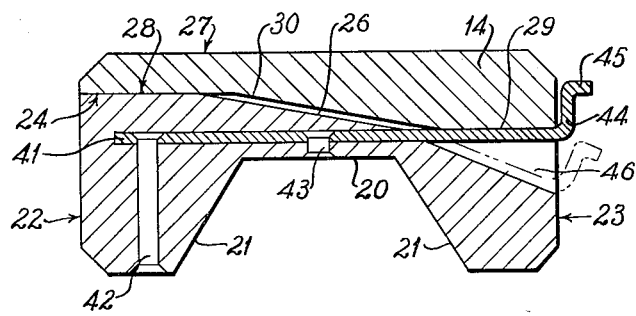
FIG. 12 is a section through the sectional clamp and the locking sleeve of the present coupling to illustrate a modified lock by which the sleeve is secured in its operative position on the sectional clamp.

In FIG. 12 is shown a further modification of the present coupling embodying a substitute for the locks 32 carried by the clamp 13 for engagement with the sleeve 14 in the preferred form of the coupling shown in FIGS. 1 to 9 incl. Here, a leaf spring 41 is mounted in a passage provided in one of the sections 13' or 13" of the clamp 13. This spring 41 is held in place by a rivet or other suitable securing means 42 piercing one of its ends and the clamp 13. An additional rivet or other fastening means 43, if required, may be provided centrally of the length of the spring 41 to secure that part of the spring 41 to the base of the groove 20 in the inner surface of the clamp 13. The outer end portion of the leaf spring 41 projects beyond the edge of the clamp 13 where it is bent laterally to create a lock 44 to overlie the adjacent end of the sleeve 14 when the coupling is assembled as aforesaid. An operating ear 45 is formed at the end of the lock 45. The normal position of the laterally-bent end lock 44, by virtue of the action of the leaf spring 41, is beyond the outer surface of the clamp 13 so that when the sleeve 14 is positioned fully home on the clamp 13, the lock 44 overlies the adjacent end of the sleeve 14 as illustrated in FIG. 12. To permit the end portion of the spring 41 and lock 44 to be moved inwardly or in a direction away from the sleeve 14 to disengage the lock 44 from contact with the end of the sleeve 14, a recess 46 is provided in the clamp 13 directly under the outer end portion of spring 41 whereby the lock 44 may be moved out of its normal position against the action of the spring. This permits the end portion 45 of the spring 42 to be moved manually or by the sleeve 14 into the recess 46 to release the sleeve or to allow the passage of the sleeve to its operative position, the spring returning to its normal position when the operating pressure is removed from the lock 44 and/or ear 45.

Either of the locks shown in FIGS. 1, 2, 6 and 7 or FIG. 12, without change or modification, may be selected for use in any form of the invention. For that reason, no lock is shown or indicated in FIGS. 10 and 11.

Also, in FIGS. 10, 11 and 12, the sections 13' and 13" of the clamp 13 may be hinged together in any suitable manner. Where the lock shown in FIGS. 1, 2, 6 and 7 is employed it, of course, serves the double function of lock and hinge, but where the lock shown in FIG. 12 is used, the sections 13' and 13" of the clamp 13 must be otherwise hinged together.

What is claimed is:

1. In a coupling to engage and secure the flared end of a tube the combination with a back-up ring having at least one side surface disposed at substantially the same angle as the angle of the flared end of the tube, of a clamp consisting of a pair of semi-circular sections, a U hinge of spring material having its arms engaging a pair of adjacent ends of said sections, said sections being provided with continuous internal grooves, each having at least one wall disposed at the same angle as the angle of the side surface of the ring and the flare of the tube, a sleeve movable over the clamp parallel to the axis of the tube to complete the closing of the clamp and to hold it closed, and lateral extensions of the arms of the U hinge normally projecting into the path of movement of the sleeve and adapted to engage the end of the sleeve when fully seated on the clamp to prevent retrograde movement thereof.

2. In a coupling to engage and secure the flared end of a tube the combination with a back-up ring having at least one side surface disposed at substantially the same angle as the angle of the flared end of the tube, of a clamp consisting of a pair of semi-circular sections, a hinge of spring material engaging a pair of adjacent ends of said sections, said sections being provided with continuous internal grooves, each having at least one wall disposed at the same angle as the angle of the side surface of the ring and the flare of the tube, and a sleeve movable over the clamp parallel to the axis of the tube, the external surface of the clamp and the internal surface of the sleeve being formed with corresponding marginal areas disposed in different planes and parallel one to the other and to the axis of the tube with the inner edges of said areas interconnected by sloping areas whereby the sloping areas of the sleeve and clamp serve as cam surfaces for the marginal areas when the sleeve is moved over the clamp to complete the closing of the clamp and the marginal areas of the clamp and sleeve serve as individual bearing surfaces to hold the clamp in the closed position aforesaid.

References Cited in the file of this patent

UNITED STATES PATENTS

| | | |
|---|---|---|
| 37,929 | Warner | Mar. 17, 1863 |
| 381,869 | Williams | Apr. 24, 1888 |
| 768,228 | Hurst | Aug. 23, 1904 |
| 1,064,154 | Miller | June 10, 1913 |
| 2,121,710 | Nielsen | June 21, 1938 |
| 2,190,882 | Pardee | Feb. 20, 1940 |
| 2,660,457 | Mallon | Nov. 24, 1953 |

FOREIGN PATENTS

| | | |
|---|---|---|
| 17,432 | Great Britain | July 31, 1911 |
| 64,674 | Austria | May 11, 1914 |
| 67,923 | Sweden | Aug. 20, 1929 |
| 444,939 | Great Britain | Mar. 31, 1936 |
| 79,910 | Denmark | June 1, 1953 |